US009424391B2

United States Patent
Papadopoulos et al.

(10) Patent No.: US 9,424,391 B2
(45) Date of Patent: Aug. 23, 2016

(54) INSTALLATION OPTIMISATION (71) Applicants: AIRBUS OPERATIONS LIMITED, Bristol (GB); ALENIA AERMACCHI SPA, Venegono Superiore (IT); FONDAZIONE BRUNO KESSLER, Trento (IT)

(72) Inventors: Christopher Papadopoulos, Bristol (GB); Antonella Cavallo, Turin (IT); Alessandro Cimatti, Trento (IT); Marco Bozzano, Trento (IT)

(73) Assignees: AIRBUS OPERATIONS LIMITED, Bristol (GB); ALENIA AERMACCHI SPA, Venegono Superiore (VA) (IT); FONDAZIONE BRUNO KESSLER, Trento (IT)

( * ) Notice: Subject to any disclaimer, the term of this patent is extended or adjusted under 35 U.S.C. 154(b) by 93 days.

(21) Appl. No.: 13/623,977

(22) Filed: Sep. 21, 2012

(65) Prior Publication Data

US 2013/0076767 A1 Mar. 28, 2013

(30) Foreign Application Priority Data

Sep. 23, 2011 (GB) .................................. 1116443.1

(51) Int. Cl.
*G06F 17/50* (2006.01)
*G06T 19/00* (2011.01)

(52) U.S. Cl.
CPC ............ *G06F 17/5095* (2013.01); *G06F 17/50* (2013.01); *G06F 2217/02* (2013.01); *G06F 2217/06* (2013.01); *G06F 2217/08* (2013.01)

(58) Field of Classification Search
CPC ......... G06T 17/00; G06T 17/50; G06T 19/00; G06T 19/20; G06F 17/5095
USPC ........................................................ 345/419
See application file for complete search history.

(56) References Cited

U.S. PATENT DOCUMENTS

| 7,505,947 | B2 * | 3/2009 | McArdle .......................... 706/13 |
| 8,539,451 | B2 * | 9/2013 | Ivancic et al. ................. 717/126 |
| 2004/0073478 | A1 * | 4/2004 | Gusikhin et al. ................ 705/11 |
| 2007/0233433 | A1 * | 10/2007 | Lee ..................... G06F 17/5095 703/1 |
| 2010/0049475 | A1 * | 2/2010 | Cazals ............................. 703/1 |
| 2010/0245351 | A1 * | 9/2010 | Sellem ........................ 345/420 |
| 2011/0296319 | A1 * | 12/2011 | Dinan et al. .................. 715/757 |

FOREIGN PATENT DOCUMENTS

| EP | 2234027 A1 | 9/2010 |
| WO | 9709685 A1 | 3/1997 |
| WO | WO 02089019 A2 * | 11/2002 |

OTHER PUBLICATIONS

Search Report corresponding to GB1116443.1, dated Jan. 20, 2012.

* cited by examiner

*Primary Examiner* — Devona Faulk
*Assistant Examiner* — Hai Tao Sun
(74) *Attorney, Agent, or Firm* — Hauptman Ham, LLP (57) ABSTRACT

A computer-implemented method for determining a configuration of a plurality of components in a systems installation which satisfies one or more constraints.

12 Claims, 3 Drawing Sheets

Figure 3

INSTALLATION OPTIMISATION

RELATED APPLICATIONS

The present application is based on, and claims priority from, British Application Number 1116443.1, filed Sep. 23, 2011, the disclosure of which is hereby incorporated by reference herein in its entirety.

FIELD OF THE INVENTION

The present invention relates to installation optimisation and, more particularly, to optimising the installation of components in a systems installation.

BACKGROUND OF THE INVENTION

When designing and building an installation, such as an aircraft, it is often necessary to arrange components within the installation such that their arrangement meets certain criteria. A systems installation is a result of a design activity that consists of positioning physical system components inside an installation, such as an aircraft. During the early stages of a design phase of specifying the installation, the systems installation is defined by geometrical 3D models that define approximately the shape, the size and the location of each system. When the design progresses, the 3D models become more accurate, eventually taking the shape of the detailed product 3D drawings that are used to manufacture the individual parts. These models look like ideal representations of the system. By "ideal representations", it is meant that they do not take into account flexibility due to gravity, or other interactions that might affect their standard shape or size.

3D computer aided design tools are used to support the definition and verification of the systems installation. A software package that can be used to model system components prior to installation is CATIA, by Dassault Systèmes.

The arrangement of components in an installation is a difficult task because an installation is made of interdependent components that must fulfil a large number of constraints. An incremental installation process is not feasible, since a slight movement of one component may enable the satisfaction of one constraint and the violation of one or more other constraints.

The process of performing a common cause analysis, which includes particular risk analysis, common mode analysis and zonal safety analysis is known from SAE ARP 4761. Its use for the development and certification of complex systems is known from SAE ARP 4754.

SUMMARY OF THE INVENTION

The invention is defined by the appended independent claims to which reference should now be made. Optional features are defined in the appended dependent claims.

BRIEF DESCRIPTION OF THE DRAWINGS

Embodiments of the invention will now be described with reference to the accompanying drawings, in which.

DETAILED DESCRIPTION OF EMBODIMENT(S)

An automated reasoning algorithm is used to calculate a plurality of installation configurations, given one or more installation constraints. The algorithm also determines the optimal installation configuration.

Figure 1:
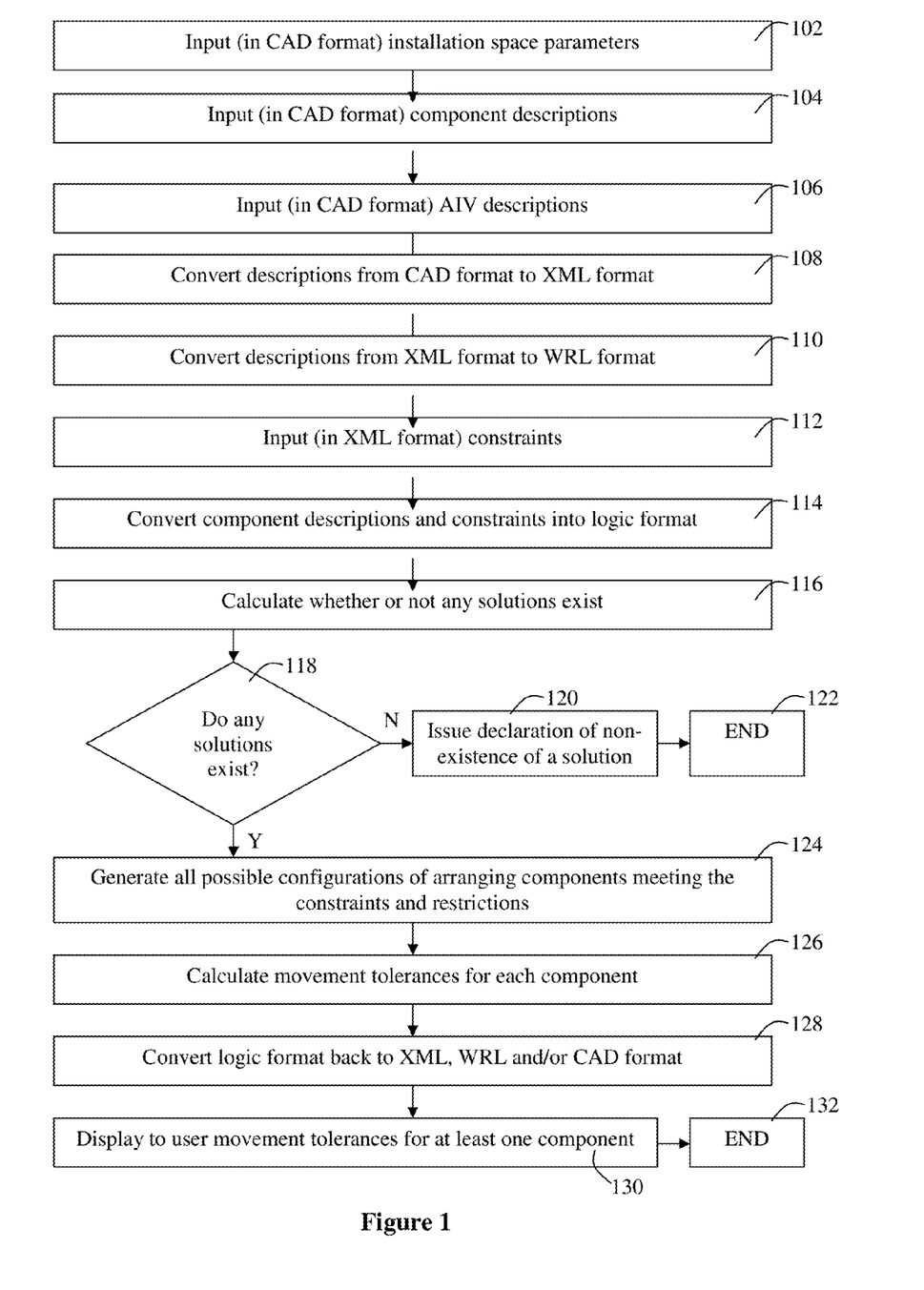
FIG. 1 is a flow diagram showing a design method according to the present invention.

FIG. 1 is a flow diagram 100 showing steps of a method for calculating all possible configurations of a systems installation. Where a step in the flow diagram 100 requires data to be input, it will be appreciated that a user may input the data in any known manner, such as by entering the data using a keyboard or keypad connected to a computer. Similarly, it will be appreciated that the data might have been entered previously, and stored, for example, in a database on a memory of the computer.

At step 102, details of an installation space within which components are to be arranged are input into the system in CAD format. For example, in a scenario where components are to be arranged within the body of an aircraft, a user might input dimensions (height, width, length) of the aircraft.

Step 104 requires an input of descriptions of the components to be installed in the installation space in CAD format. Dimensions, such as the height, width, length, and mass of each of the components may be input into the system. It will be appreciated that components to be installed will, typically, have intricate shapes, the exact dimensions of which are difficult to model. Thus, approximations of the actual shapes of the components are made. In some embodiments, the exact shape of a component is approximated using a plurality of simpler geometric shapes or volumes, such as cuboids or spheres. In one embodiment, any non-planar or non-linear surfaces of a component are converted into polyhedra having a given resolution. A default resolution may be used unless overridden by the user if, for example, a more accurate approximation is required than the one achievable using the default resolution.

In one embodiment, the component descriptions are input in the form of 3D CAD representations. However, to enable the system to calculate all possible configurations of the components within a given space, it is necessary to convert the component descriptions into a format suitable for making the necessary calculations. At step 106, the component descriptions in CAD format are converted into logic format to create a set of code such as that shown in Appendix B. Geometrical shapes representing the components within a 3D CAD tool are translated into a logical representation of the geometrical shapes. In some embodiments, this step involves only geometrical properties being described and translated. However, in other embodiments, other properties such as the components' colours and the materials from which the components are made are also included in the descriptions.

Geometrical shapes are also used to represent other regions within the installation space. For example, one or more shapes may represent a volume within which a particular component can be installed. Such a volume is known as an Acceptable Installation Volume (AIV), and these are defined in CAD format and input at step 106. Acceptable Installation Volumes are a representation of space constraints. For example, a component might need to be contained within an AIV for safety reasons. Alternatively, one or more shapes may represent a region through which a component could travel in the event that the component were to break loose in use, or in the event that the component were to burst or to fragment resulting in fragments of the component being forced in a particular direction. The region through which a component could travel is known as a fragment trajectory.

One example of when the fragment trajectory might be important is when considering where to place components relative to the rotating blades of an aircraft engine. If one of the blades were to break away from the engine, then it might travel in any direction away from the engine. Its trajectory might be towards some other components, such as cables, which, if intercepted by the blade, could be severely damaged, and could have serious consequences for the aircraft, particularly if in use.

By taking fragment trajectories into consideration, it is possible to calculate a list of components impacted by the ejected component fragments (also known as a hit list). In the case of an aircraft installation, a fragment trajectory cone can be predicted, starting from an engine or tyre location. The cone represents the possible trajectory of debris in the event of such an occurrence. Each trajectory is used to generate the list of components that could be intersected, or hit, by the fragment accounting for the range of orientations that the fragment trajectory may physically take.

At step 108, the descriptions input during the previous steps are converted from CAD format into XML format. The XML descriptions are then converted into WRL format at step 110.

In step 112, rules concerning the installation space and the components are entered in XML format. The rules can be generated manually by a user, or through the use of a functional safety and particular risk analysis tool, similar to that generated by the ISAAC (Improvement of Safety Activities on Aeronautical Complex systems) project and as part of the ISAAC-CCA (Common Cause Analysis) capability. The rules may include a list of constraints, limitations or criteria which must be met by certain components in order for a selected positioning of a particular component to be considered valid. Of course, as more components are introduced to the installation space, the number of criteria that must be met is also increased. The system aims to find all of the solutions which meet the criteria that have been provided to it.

The type of constraints provided to the system depends on the particular installation space into which components are to be installed. Constraints relating to one or more of the following might be taken into consideration.

Functionality assessments: declarations describing whether a shape or a combination of shapes represents a component, a volumes (AIV) or a fragment trajectory.

Physical requirements: constraints specifying installation properties which are not safety-related. This category might include constraints specifying that a given component has to be contained within a particular volume, or constraints specifying positioning limitations for a geometrical shape.

Example

Component A must be positioned within the lower half of the installation space.

Safety requirements: constraints specifying installation safety-related properties. This category might include constraints specifying that a particular fragment trajectory of a component or a zone of the installation cannot intersect some given combination of components, constraints specifying proximity, constraints specifying segregation, or constraints specifying orientation.

Example

Component A must not be positioned within 2 meters of component B;

Component A must not be positioned directly below component B;

Component A must not be positioned within 1 meter of any component constrained to function at a temperature exceeding 30 degrees centigrade;

Components A and B must not be positioned within the fragment trajectory of component C;

Component A must not be placed below any component capable of leaking liquid.

Problem kind: declaration specifying the kind of installation problem intended to be solved. In particular, three kinds of problems are allowed:

verification problem: given a set of geometrical shapes (each with its own initial positioning) and a set of constraints, check whether the geometrical shapes configuration satisfies the constraints;

generation problem: given a set of geometrical shapes (with initial positioning specified only for volumes and trajectories) and a set of constraints, generate a positioning for the components (i.e. a configuration) that satisfies the constraints;

adjustment problem: given a set of geometrical shapes (each with its own initial positioning) and a set of constraints, create a new positioning for the components (i.e. a new configuration) that satisfies the constraints. This enables the system to provide an indication of whether or not a component can be moved following its initial positioning and, if so, the distance by which and direction in which it can be moved while satisfying the constraints of the system.

Optimisation criteria: with a generation problem and an adjustment problem, optimisation criteria may be specified. If the system is provided with a set of criteria which, if met, result in an optimal arrangement of components, it is possible to obtain an optimal solution along with a set of other solutions that meet, all the criteria, but are less optimal.

The criteria and restrictions input into the system may be selected for safety reasons, or for non-safety reasons, such as ease of access or ease of installation. For example, it might be desirable to arrange components in a particular configuration so as to minimise the power required by the components, such as in a system of hydraulic components. Alternatively, it might be necessary to arrange components such that the distance between two particular components is greater than a predetermined minimum. Alternatively, in the case of an aircraft installation, the total length of cables might need to be minimized in order to optimize the aircraft weight. Some other requirements are justified to ease equipment maintenance or even result from industrial work sharing.

In some embodiments, the system constraints are stored in a library in a memory. The library of constraints may include the various classes of constraints such as:

shape, positioning (initial and final) and orientation of acceptable installation volumes (AIVs);

shape, positioning (initial and final) and orientation of components;

shape, positioning (initial and final) and orientation of fragment trajectories;

physical requirements of, and positioning of, components, such as containment within a particular volume, intersection with another component or with a fragment trajectory, contact between surfaces of adjacent components, placement restrictions (e.g. no liquid-carrying component above an electric component);

safety requirements resulting from a systems functional analysis combined with a particular risk analysis (PRA), such as an intersection of a maximum of N components from M, with a given fragment trajectory.

The constraints input into the system may include one or more of the following: mathematical expressions such as equality/inequality; order relationships between real-valued parameters, e.g. distance between two components being less than a predetermined constant; intersection and disjointedness or discontinuities between components; containment between components; and leaning (common surface) and touching (intersection in a common point) between components.

In one embodiment, the constraints are classified into hard constraints and soft constraints. Hard constraints are constraints which must always be satisfied in any arrangement solution calculated by the system. Soft constraints are constraints which should, ideally, be satisfied, but which do not pose a safety risk if they remain unsatisfied. In this embodiment, the objective is to satisfy as many soft constraints as possible in the final solution.

At step 114, the descriptions and the constraints are converted into logic format. Once the system has been provided with descriptions of the components and the installation space, and with the constraints which must be met, and the data has been converted into the necessary format, the solutions meeting the given constraints can be calculated. The method, at step 116 calculates whether any solutions complying with all of the constraints exists and determines whether to continue with subsequent computations at step 118.

The system does this by translating the descriptions of the components and of the installation space, and the various installation constraints previously described, into a logical formula that combines Boolean connectives with mathematical formulas in Linear Real Arithmetic (LRA) logic. This translation uses standard transformations to encode 3D primitives into LRA logic, such as the computation of the convex hull of a polyhedron, and the computation of the Minkowski difference of two polyhedra, but optimizes it in number of ways. In particular, an optimization is used to reduce the number of Minkowski difference computations, by taking into account the rotations of 3D objects. Namely, if two objects are rotated of the same angle with respect to the global axis system, it is possible to reduce the computation of the Minkowski difference of the objects in the new local axis system to the computation of the Minkowski difference of the objects in the global axis system. This reduction uses only translation primitives, hence it is much more efficient than an explicit computation of the Minkowski difference. Another optimization consists in using ad-hoc formulas for computing the Minkowski difference of 3D objects, depending on the shape of the objects, and in the way objects are approximated using polyhedra. To this aim, generic Minkowski difference computations can be specialized for each specific shape and approximation level. Finally, it is possible to optimise the encoding of specific 3D primitives, such as intersection and containment. Namely, this optimisation strategy uses specialized formulas to encode the 3D primitives, and avoids the explicit computation of the convex hull of the Minkowski difference of the involved objects. The latter optimisation works for problems where fixed rotations are used, and can also be used, together with a solver for a non-linear real theory, to solve a problem with generic rotations.

The formula resulting from the translation into LRA logic is then converted into a Conjunctive Normal Form (CNF) format, that is, into a set of clauses, each clause being a disjunction of mathematical formulas in LRA.

In order to solve the resulting problem in CNF format, a Satisfiability Modulo Theory (SMT) solver is used. An SMT solver is based upon a Satisfiability (SAT) solver, which is a tool used to check the satisfiability of a set of Boolean clauses, each clause being a disjunction of Boolean literals. The SAT solver uses a Davis-Putnam-Logemann-Loveland (DPLL) algorithm to look for one solution in the search space. The basic algorithm works as follows. The algorithm chooses a literal and assigns a truth value to it. The truth value assignment is propagated to the set of clauses, and the overall problem is simplified. Depending on the choice of the truth values that have been assigned, the problem to be solved may become unsatisfiable (no solutions exist). If the problem is satisfiable, the DPLL algorithm is recursively called, and a new literal is assigned. If the problem is unsatisfiable, instead, the algorithm backtracks to the most recently encountered decision point, and the truth value of the corresponding literal is reversed. Eventually, either one assignment to all literals in the problem is found (one solution has been found), or the entire search space has been exhausted without finding any solution (no solution exists). It will be appreciated that the basic SAT scheme can be improved using a number of optimisation strategies, such as non-chronological backtracking, conflict-driven clause learning, heuristic splitting rules, restarts, and other methods.

An SMT solver is used to solve a decision problem for a set of logical formulas that combine Boolean connectives with formulas in background theories, such as mathematical terms in LRA. The basic solving scheme of an SMT solver works by using a DPLL-based SAT solver. To this aim, the problem to be solved is converted into its Boolean abstraction, where each mathematical formula in LRA is replaced by a Boolean variable. After each decision point in the DPLL scheme, the problem is checked for Boolean satisfiability. If the problem is satisfiable, a theory solver for the theory of LRA is used to check for satisfiability of the current assignment, where each literal is replaced by the corresponding mathematical formula, in LRA logic. The result of this check is propagated back to the SAT solver, and is used by the DPLL algorithm to decide the next step. It will be appreciated that the basic SMT scheme can be improved using a number of optimisation strategies.

The basic solving strategy to find one solution, for both SAT and SMT, can be extended to find a complete set of all solutions for a given problem (ALL-SAT and ALL-SMT problems). To achieve this, the DPLL scheme is extended in the following way. Whenever one solution is found, it is accumulated, explicitly or symbolically, into an internal data structure. The solver backtracks to the most recent decision point, the truth value of the corresponding literal is reversed, and the DPLL algorithm is recursively called on the remaining part of the search space, until the search space is exhausted. It will be appreciated that the basic scheme can be improved using a number of optimisation strategies, such as techniques to generate and store sets of solutions, corresponding to partial assignments to the set of literals, in a symbolic way.

If an optimal configuration is required then, as the system calculates each possible arrangement, it grades the arrangement against a current optimum. If the newly generated arrangement is more optimal than the previous optimal arrangement, then that newly generated arrangement becomes the new optimum. The computation to find the optimum arrangement stops as soon as any remaining arrangements can be proved to be no better than the current optimum. The method uses an SMT solver which performs an ALL-SMT exploration of the search space. The ALL-SMT scheme is extended as follows, in order to keep track of the currently generated optimum, referred to as the ALL-SMT Optimisation Scheme. Whenever a solution is found, its grade is compared with respect to the existing optimum. If the newly generated solution is more optimal than the previous optimal solution, then that newly generated solution becomes the new optimum. The computation stops as soon as the search space has been exhausted. It will be appreciated that the basic scheme can be improved using a number of optimisation strategies, such as techniques to discard parts of the search space, corresponding to partial assignments, that can be proved to be less optimal than the current optimum.

If it is calculated that no solutions exists (that is, if it is determined that no single arrangement of components meets all of the criteria) then the system issues a declaration of non-existence of a solution (step 120). In other words, the system informs the user that no solutions can be found, and that, given the components and the installation space, no single arrangement of the components is possible which satisfies the constraints. The declaration may, for example, be issued to the user visually via a computer screen, or audibly via a speaker system connected to the computer system performing the method. If no solutions exist, then the method ends (step 122), and no further processing is performed until a user amends one or more of the details entered at steps 102, 104, 106 and 112.

In one embodiment, if no solution exists that meets the constraints, the system may determine and display to the user a list of constraints which, if removed or relaxed, would enable a solution to be determined.

If at least one solution compliant with the specified requirements exists, then the method progresses to step 124, where all possible arrangements of the components that satisfy all of the constraints are generated.

In embodiments where the user does not require an optimal configuration, then the system prepares a logical representation in the form of an assignment of the (Boolean and real) variables in the original problem to (Boolean and real) values of one of the possible arrangements that meets the criteria, and displays that solution to the user.

In another embodiment where the user does not require an optimal configuration, the system calculates all possible orientations and positions of the components that satisfy the constraints, and provides an indication to the user of the movement tolerances for each component (step 126). That is to say, the system provides an indication of the available space in the installation space within which a component can be moved while satisfying all of the constraints. The data is converted, at step 128, from logic format back into XML, WRL and/or CAD format, as required by the system. This conversion may require the system to convert the logical representation of the solution or solutions into a format that can be imported into, and displayed using, a 3D CAD tool. The solution may then be displayed to a user in a virtual reality mark-up language (VRML) format.

In one embodiment, a representation of one possible arrangement of the components within the installation space is displayed to a user. The user is able to select a component on the display, for example by clicking on the representation of the component using a cursor. The system displays to the user a volume within which the selected component could be moved without breaching any of the requirements or constraints (step 130). This volume may be shaded in a first way, for example coloured green, to indicate that movement within that volume is allowed. A volume into which movement of the component would result in one or more constraints to be breached may be shaded in a second way, for example coloured red. In one embodiment, a volume into which movement of the component would result in the breach of only a single constraint is shaded in a third way, for example coloured yellow or orange.

If the user does require an optimal solution, then the system returns a logical representation, or a converted 3D CAD representation, of the optimal solution on the fly as described previously, and as referred to as the "ALL-SMT Optimisation Scheme". The system calculates the optimal solution.

Once the required solution or solutions have been displayed to the user, the method ends (step 132), and no further processing is performed until a user amends one or more of the details entered at steps 102, 104, 106 and 112.

In an alternative embodiment, it is possible to calculate the possible arrangements of components in a two or more stage process. In a first stage, descriptions of one or more components representing an acceptable installation volume (AIV) are provided and positioned within the installation space in accordance with one or more constraints (e.g. proximity and/or distance from one or more other of the components). In a second stage, after the components have been positioned, they are renamed or reclassified as AIVs. That is to say, while the descriptions represent individual components, the components themselves represent volumes within which other components can be positioned, and which have their own constraints. The remaining components are then positioned within the AIVs, in accordance with their constraints. The process is repeated as the shapes of the equipment are further refined. In effect, therefore, the steps of the described with reference to FIG. 1 are carried out multiple times, for example, once to position the AIVs, and a second time to position components within the AIVs.

In an alternative embodiment, it is possible to calculate the AIV sub volumes that show where within the AIV the components can be installed unconditionally, conditionally and the volume within the AIV where no solution is found. The embodiment follows the following steps. First the constraints and problem are defined as is the case for the normal application MathSAT(3D) algorithm described above. Then a set of solutions are computed in the same way as before. Within the set of solutions a "gry" algorithm applies an ad-hoc extension of the MathSAT(3D) algorithm, to search for the region within the AIV volume where, if the components are installed, they do not satisfy the constraints regardless of whether any of the other dependent components are moved. This is called an unacceptable space, or a red space. Subsequently, the algorithm searches for a part of a sub-AIV volume, where, if a component is placed within this space, the solution space for the other dependent components is not altered. This volume is called an unconditionally acceptable space, or a green space. The algorithm marks the remaining volume as a conditionally acceptable volume, where locating the component within this space alters the solution space of the other dependent components, while preserving satisfiability. Finally the results are converted into a solution.xml file and a solution.wrl file for ease of visualisation. This is given for each of the individual components within the installation.

The method steps described with reference to FIG. 1 can be carried out in the manner described above, and using tools such as MathSAT(3D), by Fondazione Bruno Kessler and CATIA, by Dassault Systèmes, or can be carried out manually following the XML problem file format shown in Appendix D.

It will be appreciated that, while the steps have been described in a particular order, the steps could be carried out in a different order. Similarly, it will be apparent that, in some embodiments, not all of the described steps are required. For example, if data and descriptions are entered in a different format, conversion of those data and/or descriptions might not be required. Thus, the invention is able to carry out the described method with one or more of the steps described with reference to FIG. 1 having been omitted. In some embodiments, data may be entered in a format different to the formats described above.

CATIA

The 3D CAD tool CATIA is capable of generating a first description of the geometrical shapes. Since the implementation of a direct generator of a logical description of the shapes from CATIA shall be not feasible, an intermediate representation is introduced between the one internal to CATIA and the logical one.

A number of translation steps are required to ensure data used by CATIA is compatible with the MathSAT 3D tool.

1. Catia2XML Translator: The CATIA models are converted into an XML format.
2. XML2MathSAT3D Logic Input Format: A second translation step takes the data in the XML format and converts it into a logical format.
3. XML2WRL: A third translation algorithm takes the XML and converts it into a WRL format.

An XML representation of the geometrical shapes is generated by a CATIA-to-XML translator.

3D Translator

This translator is responsible for the translation from the intermediate XML format to the logical description of the shapes (XML2MathSAT3D) and for the translation of the logical description of the computed installation into the intermediate XML format (MathSAT3D2XML).

The translator is also able to translate from the XML intermediate format and from the logical description of the computed installation configuration to a VRML format (XML2WRL and MathSAT3D2WRL respectively). This capability is used for solutions visualization purposes. The translator provides the functionality of translation from the UnSAT-Core provided by MathSAT into the original MathSAT(3D) constraints. Moreover, it has the capability to automatically generate a set of safety constraints starting from the results of the interference analysis and particular risk analysis generated by the EC FP6 ISAAC (Improvement of Safety Activities on Aeronautical Complex systems) project (contract number STREP AST3-CT-2003-501848).

MathSAT(3D)

MathSAT(3D) is a tool built on top of an SMT (Satisfiability Modulo Theories) solver, such as MathSAT, that allows a user to manage geometrical shapes and to describe constraints and optimisation requirements on these geometrical shapes.

Version 2.0 of MathSAT(3D) supports the following additional features:
  the support for solids of revolution such as cones, truncated cones, cylinders and spheres. They are approximated as a discrete solid with a predefined number of faces. The system generates automatically the rotations of the shapes if they are not provided by the user. These new features get their input parameters via a configuration file;
  the support for predicates such as LeansOn, Touches and for distance computation. The LeansOn predicate specifies if a solid leans on another solid. If this constraint is used, it is recommended not to specify the rotations manually, but to allow MathSAT(3D) to define them automatically, due to the approximation errors introduced by the translation. The Touches predicate is similar to LeansOn, but it specifies if a shape touches another shape. In this case it is possible to specify manually the rotations. The distance constraint specifies the distance between two points. In this case two methods of computing distances are provided: one which guarantees a precision bounded by an error of less then 2%, and the so-called Manhattan distance. The computation of the Manhattan distance uses an approximated formula with some adjustment parameters, in order to improve the precision of the approximation. The Manhattan distance is less precise, but it has a higher performance, and it maintains the comparability between distances and the direction of derivative with respect to the Euclidean distance. In addition, MathSAT(3D) provides ways to compute both over-approximations and under-approximations for the same distance computation. To this aim, both methods to compute distances, have been adapted to compute an over-approximation and an under-approximation. Over-approximations and under-approximations are used alternatively, depending on the constraints of the problem to be solved; namely, each instance of a distance computation is computed either using an over-approximation or an under-approximation, depending on the polarity of the formula containing the distance primitive. This method guarantees the correctness of the results;
  the support for minimization of continuous functions (in particular sum of distances) using discretization. The coefficient of discretization is provided via the configuration file;
  the functionality that permits the computation of the Red, Green and Yellow areas (acceptable, conditionally acceptable, and unacceptable installation sub-volumes) of a specific shape;
  the UnSAT-Core functionality, that permits the generation of the minimal set of constraints which make a given formula unsatisfiable.

Example

The code in Appendix A shows a small example that demonstrates the calculation phases of the functioning system. Consider a system composed of 3 trajectories named, respectively, 'traj1', 'traj2' and 'traj3', an installation space, or containment volume, named 'vol' and three components named respectively 'comp1', 'comp2' and 'comp3'. These geometrical shapes are extracted from a 3D CAD tool (CATIA) and an XML representation is generated from them, as shown in Appendix A.

Each shape description is enclosed in a pair of shape commands <shape></shape> and, for each geometrical shape, the type of shape is specified (with the parameter type of the tag <shape>), the dimensions (by using the tag <dimensions>) and the positioning which is specified by giving a translation point (by using the tag <translationPt>) and an orientation (by describing three vectors with the tags <XVector>, <YVector> and <ZVector>). The remaining tags are used for visualization purpose.

Figure 2:
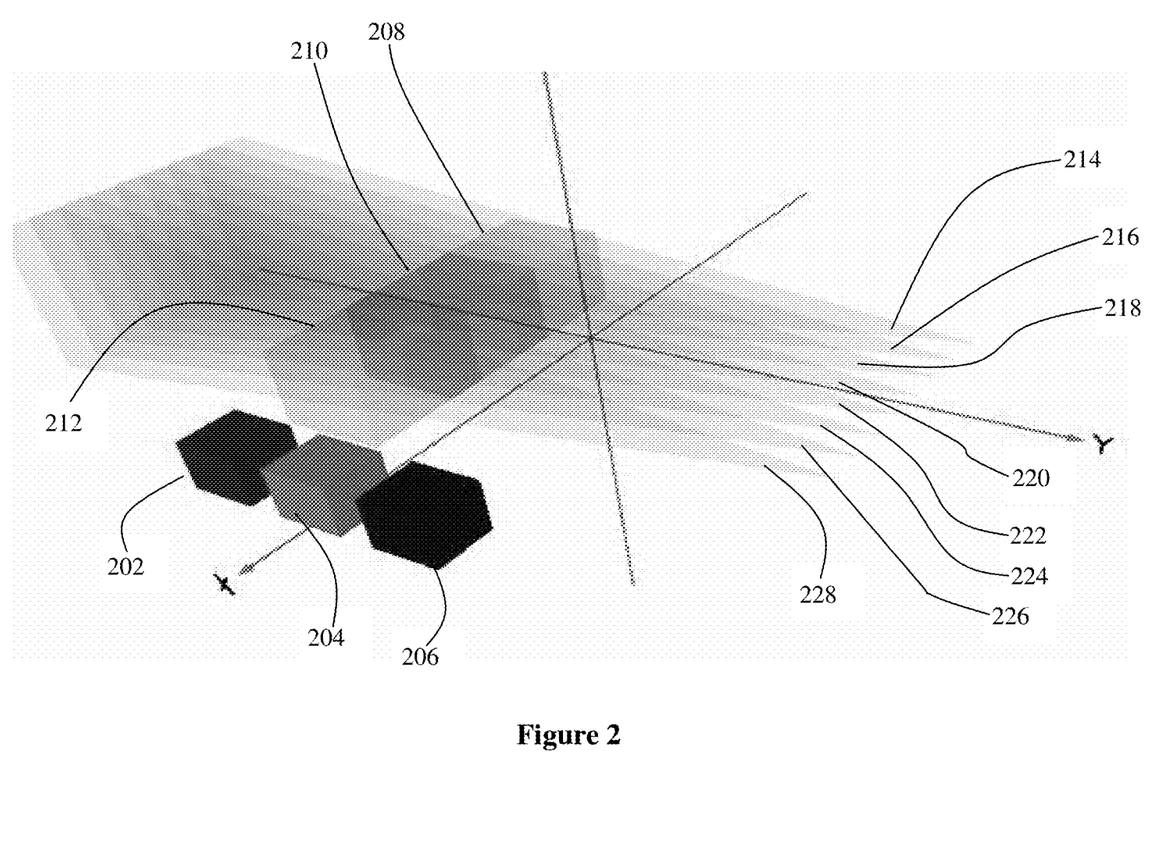
FIG. 2 is a virtual reality mark-up language representation generated by the present invention prior to optimisation.

FIG. 2 shows an example of a WRL representation of shapes defining an installation space, some components to be installed in and AIVs, and some fragment trajectory paths.

In this example, components 202, 204 and 206 are to be installed in AIVs 208, 210 and 212 respectively. Fragment trajectory paths are shown by regions 214, 216, 218, 220, 222, 224, 226, and 228. In this example, the installation must meet two constraints. Firstly, each component must be contained within its own AIV, and, secondly, each component must be installed in such a way that no two components can be impacted by the same fragment trajectory path.

Figure 3:
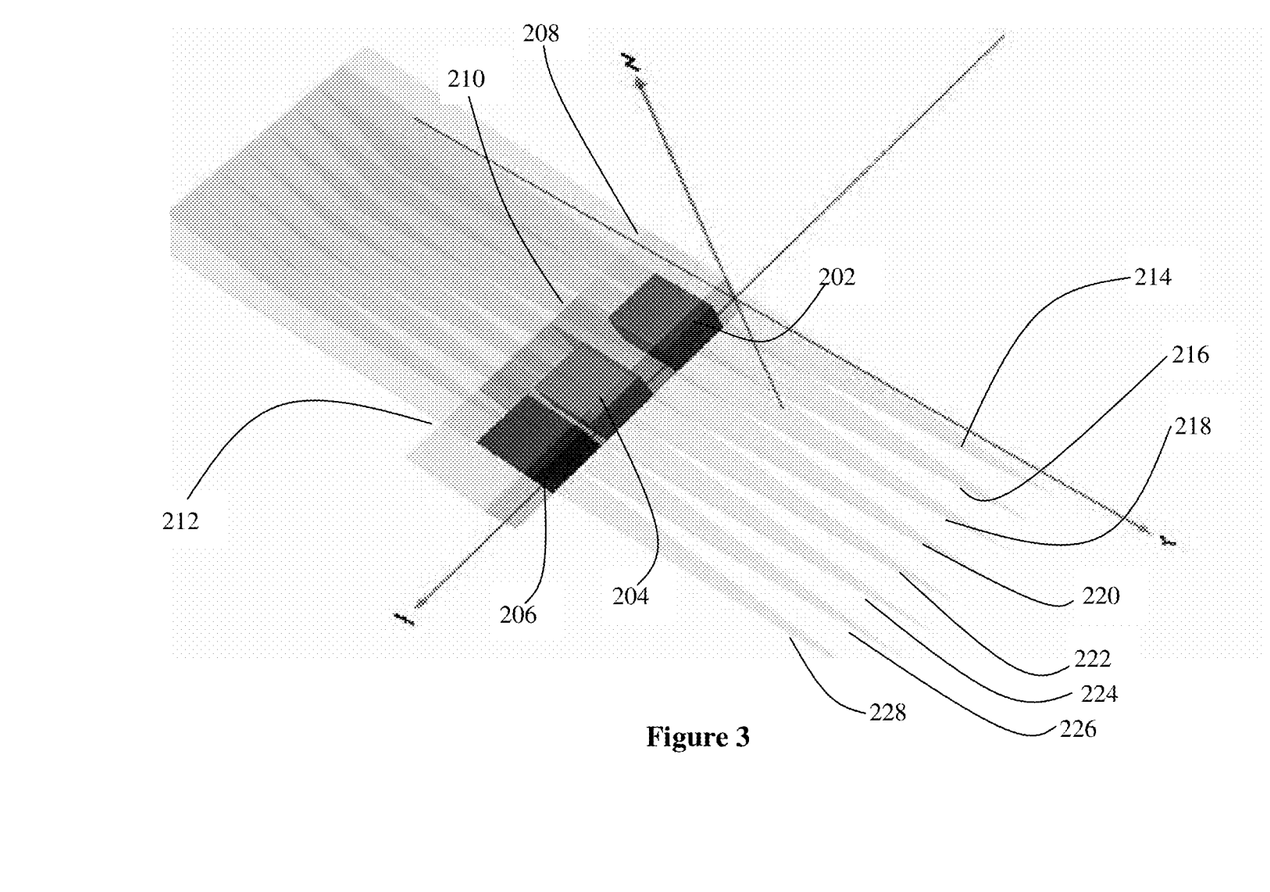
FIG. 3 is a virtual reality mark-up language representation generated by the present invention after optimisation.

FIG. 3 shows a WRL representation of the solution computed by MathSAT(3D) regarding how the components 202, 204, 206 can be installed in the AIVs 208, 210, 212 such that the two constraints are met.

While carrying out the method to determine the possible configurations, the XML file is translated in a logical description of the shapes in the MathSAT(3D) input language. An example of the contents of the XML file that contains the translation file is shown in Appendix B.

At this point, the constraints and the problem definitions are added. A possible set of constraints together with a problem definition for the set of geometrical shapes described in the previous file is shown in Appendix C.

Referring to Appendix C, the three declarations at the top of the file specify the functionality of the geometrical shapes. The following 6 constraints are non-safety related constraints specifying that the volume has to contain all three components (the first three constraints) and that the components cannot overlap (the remaining three constraints).

The final constraint is a safety-related formula specifying that the trajectories cannot intersect two components at the same time. Finally, the last row specifies the kind of problem: it is an adjustment problem that requires the minimization of the number of "low danger" trajectories, where a trajectory is "low danger" if it intersects exactly one component.

This set of constraints (together with the logical description of the geometrical shapes) is given as an input to MathSAT(3D) that then generates a new configuration for the components that satisfies the constraints and minimizes the optimization function if a configuration that satisfies the constraints exists. Appendix D shows, in XML format, the result of this execution, which is contained within the results file.

The invention provides an algorithm for finding an optimum installation configuration that can be executed using a software package such as MathSAT(3D). The installation optimisation capability is achieved using a translation of 3D geometry from a 3D mock-up tool such as Catia, multiple particular risk volumes, installation constraints in the form of equations or acceptable installation volumes (this defines an allocation volume for each equipment or combinations of equipment), safety requirements and some kind of optimisation criteria such as, "minimise the affected number of components (i.e. components to be moved)". The algorithm returns with possible installation solutions. In the case where no solution exists due to an over-constrained problem, then the tool returns with a list of relaxations that could lead to possible solutions. The tool generates a VRML representation of the result and there is a facility to re-import the modifications of the equipment blocks back into Catia.

The algorithm finds the optimum solution/configuration for the installation of components given the constraints and limitations provided by a user. By generating all possible configurations which meet the constraints, the algorithm is able to provide the use with a tolerance indication for each component. In other words, the algorithm is able to provide the user with an indication of how much each component can be moved from its optimum position while still remaining within the constraints. The algorithm returns a complete set of solutions for a given set of constraints. It also allows a user to add new constraints or requirements, and updates the set of allowed configurations or solutions accordingly.

So far, the invention has been described in terms of individual embodiments. However, one skilled in the art will appreciate that various embodiments of the invention, or features from one or more embodiments, may be combined as required. It will be appreciated that various modifications may be made to these embodiments without departing from the scope of the invention, which is defined by the appended claims.

APPENDIX A

```
<?xml version="1.0" encoding="utf-8" ?>
<shapes unit="mm">
<shape type="truncated_pyramid" name="traj1">
<dimensions y1="100" x1="100"
y2="60" x2="60" z="100" />
<color r="0.0" g="1.0" b="0.0" />
transparency value="0.6" />
<translationPt x="-50" y="0" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="truncated_pyramid" name="traj2">
<dimensions y1="50" x1="40"
y2="25" x2="20" z="100" />
<color r="1.0" g="0.0" b="0.0" />
transparency value="0.6" />
<translationPt x="20" y="25" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="truncated_pyramid" name="traj3">
<dimensions y1="50" x1="40"
y2="20" x2="25" x="100" />
<color r="0.0" g="0.0" b="1.0" />
<transparency value="0.6" />
<translationPt x="20" y="-25" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="parallelepiped" name="vol">
<dimensions y="100" x="140"
z="100" />
<color r="1.0" g="0.0" b="1.0" />
<transparency value="0.9" />
<translationPt x="-100" y="-50" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="parallelepiped" name="comp1">
<dimensions y="10" x="10"
z="10" />
<color r="0.0" g="1.0" b="1.0" />
transparency value="0.4" />
<translationPt x="0" y="0" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="parallelepiped" name="comp2">
<dimensions y="25" x="25"
z="25" />
<color r="1.0" g="1.0" b="0.0" />
<transparency value="0.4" />
<translationPt x="0" y="0" z="0" />
<XVector x="1.0" y="0.0" z="0.0" />
<YVector x="0.0" y="1.0" z="0.0" />
<ZVector x="0.0" y="0.0" z="1.0" />
</shape>
<shape type="parallelepiped" name="comp3">
<dimensions y="40" x="40"
z="40" />
<color r="1.0" g="1.0" b="1.0" />
<transparency value="0.4" />
<translationPt x="0" y="0" z="0" />
<XVector x="1.0" y="0.0" z="0.0" />
<YVector x="0.0" y="1.0" z="0.0" />
<ZVector x="0.0" y="0.0" z="1.0" />
</shape>
</shapes>
```

APPENDIX B

```
VAR traj1 : TRPYRAMID
PARAMETER dims(traj1) = { bottomXLen=100.00,
bottomYLen=100.00, topXLen=60.00, topYLen=60.00,
zLen=100.00 }
PARAMETER initPos(traj1) = { trPoint=(-50.00,0.00,0.00),
orientation=[(1.00,0.00,0.00),(0.00,1.00,0.00),(0.00,0.00
,1.00)] }
VAR traj2 : TRPYRAMID
PARAMETER dims(traj2) = { bottomXLen=40.00,
bottomYLen=50.00,
topXLen=20.00, topYLen=25.00, zLen=100.00 }
PARAMETER initPos(traj2) = { trPoint=(20.00,25.00,0.00),
orientation=[(1.00,0.00,0.00),(0.00,1.00,0.00),(0.00,0.00
,1.00)] }
VAR traj3 : TRPYRAMID
PARAMETER dims(traj3) = { bottomXLen=40.00,
bottomYLen=50.00,
topXLen=20.00, topYLen=25.00, zLen=100.00 }
PARAMETER initPos(traj3) = { trPoint= (20.00,-25.00,0.00),
orientation=[(1.00,0.00,0.00),(0.00,1.00,0.00),(0.00,0.00
,1.00)] }
VAR vol : PARALLELEPIPED
PARAMETER dims(vol) = { xLen=140.00, yLen=100.00,
zLen=100.00 }
PARAMETER initPos(vol) = { trPoint=(-100.00,-50.00,0.00),
orientation=[(1.00,0.00,0.00),(0.00,1.00,0.00),(0.00,0.00
,1.00)] }
VAR comp1 : PARALLELEPIPED
PARAMETER dims(comp1) = { xLen=10.00, yLen=10.00,
zLen=10.00 }
PARAMETER initPos(comp1) = { trPoint=(0.00,0.00,0.00),
orientation=[(1.00,0.00,0.00),(0.00,1.00,0.00),(0.00,0.00
,1.00)] }
VAR comp2 : PARALLELEPIPED
PARAMETER dims(comp2) = { xLen=25.00, yLen=25.00,
zLen=25.00 }
PARAMETER initPos(comp2) = { trPoint=(0.00,0.00,0.00),
orientation=[(1.00,0.00,0.00),(0.00,1.00,0.00),(0.00,0.00
,1.00)] }
VAR comp3 : PARALLELEPIPED
PARAMETER dims(comp3) = { xLen=40.00, yLen=40.00,
zLen=40.00 }
PARAMETER initPos(comp3) = { trPoint=(0.00,0.00,0.00),
orientation=[(1.00,0.00,0.00),(0.00,1.00,0.00),(0.00,0.00
,1.00)] }
```

APPENDIX C

```
KIND traj1, traj2, traj3 : TRAJECTORY
KIND vol : VOLUME
KIND comp1, comp2, comp3 : COMPONENT
FORMULA contains(vol,comp1)
FORMULA contains(vol,comp2)
FORMULA contains(vol,comp3)
FORMULA disjoint(comp1,comp3)
FORMULA disjoint(comp1,comp2)
FORMULA disjoint(comp2,comp3)
DEFINE high_danger1 : BOOLEAN := ((intersect(traj1,comp1)
& intersect(traj1,comp2)) | (intersect (traj1,comp1) &
intersect(traj1,comp3)) | (intersect(traj1,comp2) &
intersect(traj1,comp3)))
DEFINE high_danger2 : BOOLEAN := ((intersect(traj2,comp1)
& intersect(traj2,comp2)) | (intersect(traj2,comp1) &
intersect(traj2,comp3)) | (intersect(traj2,comp2) &
intersect(traj2,comp3)))
DEFINE high_danger3 : BOOLEAN := ((intersect(traj3,comp1)
& intersect(traj3,comp2)) | (intersect(traj3,comp1) &
intersect(traj3,comp3)) | (intersect(traj3,comp2) &
intersect(traj3,comp3)))
FORMULA (high_danger1 = false) & (high_danger2 = false) &
(high_danger3 = false)
DEFINE low_danger1 : BOOLEAN := (intersect(traj1,comp1) |
intersect(traj1,comp2) | intersect(traj1,comp3))
DEFINE low_danger2 : BOOLEAN := (intersect(traj2,comp1) |
intersect(traj2,comp2) | intersect(traj2,comp3))
DEFINE low_danger3 : BOOLEAN := (intersect(traj3,comp1) |
intersect(traj3,comp2) | intersect(traj3,comp3))
```

APPENDIX C-continued

```
PROBLEM ADJUST MINIMIZE countTrue(low_danger1=true,
low_danger2=true, low_danger3=true)
```

APPENDIX D

```xml
<?xml version="1.0" encoding="utf-8" ?>
<shapes unit="mm">
<shape type="truncated_pyramid" name="traj1" instance="">
<color r="0.000000" g="1.000000" b="0.000000" />
transparency value="0.600000" />
<translationPt x="-100.000000" y="-50.000000"
z="0.000000" />
<XVector x="1.000000" y="0.000000" z="0.000000" />
<YVector x="0.000000" y="1.000000" z="0.000000" />
<ZVector x="0.000000" y="0.000000" z="1.000000" />
<dimensions y1="100.000000"
x1="100.000000" y2="100.000000"
x2="60.000000" z="100.000000" />
</shape>
<shape type="truncated_pyramid" name="traj2" instance="">
<color r="1.000000" g="0.000000" b="0.000000" />
transparency value="0.600000" />
<translationPt x="0.00000" y="-50.00000" z="0.00000"
/>
<XVector x="1.000000" y="0.000000" z="0.000000" />
<YVector x="0.000000" y="1.000000" z="0.000000" />
<ZVector x="0.000000" y="0.000000" z="1.000000" />
Dimensions y1="50.000000" x1="40.000000"
y2="50.000000" x2="20.000000"
z="100.000000" />
</shape>
<shape type="truncated_pyramid" name="traj3" instance="">
<color r="0.000000" g="0.000000" b="1.000000" />
transparency value="0.600000" />
<translationPt x="0.00000" y="0.00000" z="0.00000"
/>
<XVector x="1.000000" y="0.000000" z="0.000000" />
<YVector x="0.000000" y="1.000000" z="0.000000" />
<ZVector x="0.000000" y="0.000000" z="1.000000" />
<dimensions y1="50.000000" x1="40.000000"
y2="50.000000" x2="25.000000"
z="100.000000" />
</shape>
<shape type="parallelepiped" name="vol" instance="">
<color r="1.000000" g="0.000000" b="1.000000" />
transparency value="0.900000" />
<translationPt x="-100.000000" y="-50.000000"
z="0.000000" />
<XVector x="1.000000" y="0.000000" z="0.000000" />
<YVector x="0.000000" y="1.000000" z="0.000000" />
<ZVector x="0.000000" y="0.000000" z="1.000000" />
<dimensions y="150.000000"
x="100.000000" z="100.000000" />
</shape>
<shape type="parallelepiped" name="comp1" instance="">
<color r="0.000000" g="0.000000" b="1.000000" />
transparency value="0.400000" />
<translationPt x="-10.000000" y="50.000000"
z="75.000000" />
<XVector x="1.000000" y="0.000000" z="0.000000" />
<YVector x="0.000000" y="1.000000" z="0.000000" />
<ZVector x="0.000000" y="0.000000" z="1.000000" />
<dimensions y="10.000000"
x="10.000000" z="10.000000" />
</shape>
<shape type="parallelepiped" name="comp2" instance="">
<color r="1.000000" g="1.000000" b="0.000000" />
transparency value="0.400000" />
<translationPt x="-25.000000" y="50.000000"
z="50.000000" />
<XVector x="1.000000" y="0.000000" z="0.000000" />
<YVector x="0.000000" y="1.000000" z="0.000000" />
<ZVector x="0.000000" y="0.000000" z="1.000000" />
<dimensions y="25.000000"
x="25.000000" z="25.000000" />
</shape>
<shape type="parallelepiped" name="comp3" instance="">
```

APPENDIX D-continued

```
<color r="1.000000" g="1.000000" b="1.000000" />
transparency value="0.400000" />
<translationPt x="-40.000000" y="50.000000"
z="10.000000" />
<XVector x="1.000000" y="0.000000" z="0.000000" />
<YVector x="0.000000" y="1.000000" z="0.000000" />
<ZVector x="0.000000" y="0.000000" z="1.000000" />
<dimensions y="40.000000"
x="40.000000" z="40.000000" />
</shape>
         </shapes>
```

The invention claimed is:

1. A computer-implemented method for determining a set of possible configurations of a user-selected set of aircraft components in an aircraft installation which satisfy a set of constraints, the method comprising:
receiving a set of physical properties associated with each of the plurality of aircraft components;
receiving the set of constraints relating to arranging the set of aircraft components, the set of constraints including at least relative positioning constraints, component intersection constraints, fragment trajectory constraints, maximum size constraints, and safety constraints;
determining a set of possible configurations of the set of aircraft components that satisfies the received set of constraints;
generating a single representation of at least one of the determined configurations of the set of aircraft components that satisfies the received set of constraints;
displaying the single representation to a user; and
indicating, in the single representation, for at least one aircraft component in the set of aircraft components, corresponding volumes within the aircraft installation into which the at least one aircraft component could be moved while satisfying the received set of constraints.

2. A method according to claim 1, wherein the determining step comprises determining all possible configurations of arranging the set of aircraft components that satisfies said received set of constraints.

3. A method according to claim 1, wherein the determining step comprises using a Satisfiability Modulo Theory (SMT) solver to determine each possible configuration of aircraft components.

4. A method according to claim 1, wherein the set of constraints includes constraints defining a volume of an aircraft within which one or more of the set of aircraft components can be installed.

5. A method according to claim 1, further comprising the step of generating, after receiving said set of physical properties, a representation of each of the set of aircraft components.

6. A method according to claim 1, further comprising notifying a user if at least one configuration that satisfies the received set of constraints cannot be determined.

7. A method according to claim 1, wherein the single representation of the configuration satisfying all of the constraints comprises a virtual reality mark-up language (VRML) representation.

8. A method according to claim 1, wherein, for at least one component of the set of aircraft components, at least one property in the set of physical properties comprises the shape of the at least one aircraft component.

9. A method according to claim 8, wherein the shape of the at least one aircraft component is approximated by geometric shapes.

10. A method according to claim 1, wherein, for at least one of the set of aircraft components, at least one property in the set of physical properties comprises a potential trajectory of the at least one aircraft component fragment in the event of a component being fragmented.

11. A non-transitory computer-readable medium storing computer program code which, when executed, performs the method of claim 1.

12. A method according to claim 1, wherein the set of constraints comprises a subset of hard constraints and a subset of soft constraints.

* * * * *